(12) United States Patent
Aoki

(10) Patent No.: US 8,871,836 B2
(45) Date of Patent: Oct. 28, 2014

(54) POLYCARBONATE RESIN COMPOSITION, MOLDED ARTICLE AND STRUCTURE MEMBER FOR SOLAR PHOTOVOLTAIC POWER GENERATION

(75) Inventor: Yusuke Aoki, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 13/883,663

(22) PCT Filed: Oct. 27, 2011

(86) PCT No.: PCT/JP2011/074873
§ 371 (c)(1),
(2), (4) Date: Jul. 23, 2013

(87) PCT Pub. No.: WO2012/063652
PCT Pub. Date: May 18, 2012

(65) Prior Publication Data
US 2013/0303672 A1   Nov. 14, 2013

(30) Foreign Application Priority Data

Nov. 8, 2010   (JP) ................................. 2010-249633

(51) Int. Cl.
| | |
|---|---|
| C08K 9/10 | (2006.01) |
| C08L 83/06 | (2006.01) |
| C08K 3/22 | (2006.01) |
| C08L 69/00 | (2006.01) |
| H01L 31/048 | (2014.01) |
| C08K 9/04 | (2006.01) |

(52) U.S. Cl.
CPC . C08L 83/06 (2013.01); C08K 3/22 (2013.01); C08L 69/00 (2013.01); C08K 2003/2241 (2013.01); C08K 2201/005 (2013.01); Y02E 10/50 (2013.01); H01L 31/0485 (2013.01); C08K 9/04 (2013.01)
USPC ............. 523/210; 523/200; 524/15; 524/166; 524/495

(58) Field of Classification Search
USPC ........... 523/200, 210; 524/156, 166, 494, 495
See application file for complete search history.

(56) References Cited

U.S. PATENT DOCUMENTS

| | | | | |
|---|---|---|---|---|
| 2005/0085580 | A1* | 4/2005 | Marugan et al. | 524/431 |
| 2006/0159926 | A1* | 7/2006 | Funaki et al. | 428/412 |
| 2007/0191518 | A1* | 8/2007 | Chen et al. | 524/155 |
| 2007/0299169 | A1 | 12/2007 | Ohira et al. | |
| 2007/0299174 | A1* | 12/2007 | Chen et al. | 524/158 |
| 2008/0004397 | A1* | 1/2008 | An et al. | 525/67 |
| 2008/0081855 | A1* | 4/2008 | Mullen | 524/105 |
| 2008/0212213 | A1* | 9/2008 | Kogure et al. | 359/838 |
| 2009/0239983 | A1 | 9/2009 | Nodera et al. | |
| 2010/0048779 | A1 | 2/2010 | Hayata | |
| 2013/0082222 | A1 | 4/2013 | Aoki | |

FOREIGN PATENT DOCUMENTS

| | | |
|---|---|---|
| CN | 101616992 A | 12/2009 |
| JP | 47 40445 | 10/1972 |
| JP | 62 141060 | 6/1987 |
| JP | 11 352731 | 12/1999 |
| JP | 2000 178418 | 6/2000 |
| JP | 2003 147189 | 5/2003 |
| JP | 2005 15657 | 1/2005 |
| JP | 2005 344077 | 12/2005 |
| JP | 2006 28389 | 2/2006 |
| JP | 2006 188651 | 7/2006 |
| JP | 4141019 | 8/2008 |
| JP | 2009 155381 | 7/2009 |
| WO | WO2004/081070 | 9/2004 |

OTHER PUBLICATIONS

International Search Report Issued Dec. 6, 2011 in PCT/JP11/74873 Filed Oct. 27, 2011.
Chinese Official Action, May 19, 2014, 8pp.

* cited by examiner

Primary Examiner — Peter Szekely
(74) Attorney, Agent, or Firm — Oblon, Spivak, McClelland, Maier & Neustadt, L.L.P.

(57) ABSTRACT

Provided are: a polycarbonate-based resin composition, including: (A) 100 parts by mass of a resin mixture formed of: 30 to 100 mass % of a PC-POS copolymer (A-1) which has constituent units represented by a general formula (I) and a general formula (II), and in which an average repetition number n of organosiloxane constituent units in the general formula (II) is 70 to 500; and 70 to 0 mass % of an aromatic polycarbonate resin (A-2) except the PC-POS copolymer (A-1); (B) 0.01 to 0.15 part by mass of an alkaline (earth) metal salt of an organic sulfonic acid; (C) 0.1 to 1 part by mass of a polytetrafluoroethylene having a fibril-forming ability; and (D) 2 to 15 parts by mass of titanium dioxide particles each having, on an outermost surface thereof, a coating layer formed of a polyol free of a nitrogen atom; a molded article obtained by molding the resin composition; and a structure member for solar photovoltaic power generation formed of the molded article. The polycarbonate-based resin composition, molded article, and structure member for solar photovoltaic power generation each have excellent flame retardancy and excellent tracking resistance without impairing a low-temperature impact characteristic which a PC-POS copolymer has.

9 Claims, No Drawings

POLYCARBONATE RESIN COMPOSITION, MOLDED ARTICLE AND STRUCTURE MEMBER FOR SOLAR PHOTOVOLTAIC POWER GENERATION

TECHNICAL FIELD

The present invention relates to a polycarbonate-based resin composition, a molded article obtained by molding the resin composition, and a structure member for solar photovoltaic power generation formed of the molded article.

BACKGROUND ART

Solar photovoltaic power generation modules that convert solar energy into electrical energy may lose their power-generating abilities owing to, for example, defective connection between the modules or a reduction in quantity of sunlight due to the occurrence of a partial shadow in any one of the modules. A junction box for solar photovoltaic power generation (including a connector) serves to prevent the power-down of an entire system due to such loss of the power-generating abilities.

Here, a structure member for solar photovoltaic power generation such as the junction box for solar photovoltaic power generation has been required to have characteristics such as a high degree of low-temperature impact characteristic, tracking resistance, and flame retardancy because the structure member is typically placed outdoors. In addition, requisites for a material of the structure member have become more and more sophisticated in association with demands for the thinning and design of the structure member for solar photovoltaic power generation.

A polycarbonate-polydimethylsiloxane copolymer (hereinafter sometimes referred to as "PC-PDMS copolymer"), which is a polycarbonate-based material, has been known as a resin material having a high degree of low-temperature impact characteristic. However, when the PC-PDMS copolymer alone is used as a structure member for solar photovoltaic power generation, the structure member is poor in tracking resistance and is hence inconvenient unless the structure member is treated.

A resin composition blended with various compounds has been known for improving various characteristics of such polycarbonate-based material (see Patent Literatures 1 to 5). Patent Literature 1 discloses a resin composition containing an aluminum borate whisker, and Patent Literature 2 discloses a resin composition containing an alloy of a polycarbonate resin and a polybutylene terephthalate resin. However, the resin composition of Patent Literature 1 is remarkably poor in low-temperature impact characteristic, though its rigidity improves because the whisker is used. In addition, there is a possibility that a harmful substance is generated at the time of the combustion of the resin because an organobromine compound is used. In addition, such alloy as disclosed in Patent Literature 2 also causes a reduction in low-temperature impact characteristic.

In addition, Patent Literatures 3 and 4 each disclose a resin composition containing a low-molecular weight silicone compound. However, even the incorporation of the low-molecular weight silicone compound cannot improve the tracking resistance of the composition, and a concern is raised about the following problem. An electrical contact becomes defective owing to a volatile component of the low-molecular weight silicone compound.

Further, in Patent Literature 5, an attempt has been made to blend titanium dioxide into a resin composition to improve its tracking resistance, but no investigations have been conducted on the surface treatment and impact resistance of titanium dioxide.

CITATION LIST

Patent Literature

[PTL 1] JP 4141019 B2
[PTL 2] JP 2000-178418 A
[PTL 3] JP 2003-147189 A
[PTL 4] JP 2009-155381 A
[PTL 5] JP 62-141060 A

SUMMARY OF INVENTION

Technical Problem

As described above, a polycarbonate-based resin composition satisfying all of a low-temperature impact characteristic, tracking resistance, and flame retardancy has been demanded.

The problem to be solved by the present invention is to provide the following polycarbonate-based resin composition and a molded article obtained by molding the resin composition, and a structure member for solar photovoltaic power generation formed of the molded article. The composition has excellent tracking resistance and excellent flame retardancy without impairing a low-temperature impact characteristic which a polycarbonate-polyorganosiloxane copolymer (PC-POS copolymer) has.

Solution to Problem

The inventors of the present invention have found that the problems can be solved by the following procedure, and have completed the present invention. A PC-POS copolymer in which the average repetition number of organosiloxane constituent units falls within a specific range is blended with specific amounts of an alkaline (earth) metal salt of an organic sulfonic acid and a polytetrafluoroethylene having a fibril-forming ability, and is further blended with a specific amount of titanium dioxide particles each having, on its outermost surface, a coating layer formed of a polyol free of a nitrogen atom.

That is, the present invention provides the following items (1) to (3).

(1) A polycarbonate-based resin composition, including:
(A) 100 parts by mass of a resin mixture formed of:
30 to 100 mass % of a polycarbonate-polyorganosiloxane copolymer (A-1) which has a constituent unit represented by a general formula (I) and a constituent unit represented by a general formula (II), and in which an average repetition number n of organosiloxane constituent units in the general formula (II) is 70 to 500; and
70 to 0 mass % of an aromatic polycarbonate resin (A-2) except the polycarbonate-polyorganosiloxane copolymer (A-1);
(B) 0.01 to 0.15 part by mass of an alkaline metal salt and/or alkaline earth metal salt of an organic sulfonic acid;
(C) 0.1 to 1 part by mass of a polytetrafluoroethylene having a fibril-forming ability; and
(D) 2 to 15 parts by mass of titanium dioxide particles each having, on an outermost surface thereof, a coating layer formed of a polyol free of a nitrogen atom.

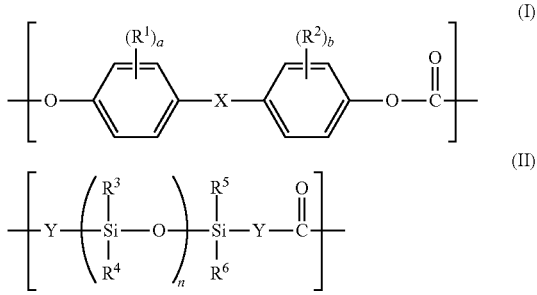

(In the formulae (I), $R^1$ and $R^2$ each independently represent an alkyl group having 1 to 6 carbon atoms or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —$SO_2$—, —O—, or —CO—, and a and b each independently represent an integer of 0 to 4. In addition, in the formula (II), $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, Y represents an organic residue containing an aliphatic or aromatic group, and n represents the average repetition number.)

(2) A molded article, which is obtained by molding the polycarbonate-based resin composition according to the above-mentioned item (1).

(3) A structure member for solar photovoltaic power generation, including the molded article according to the above-mentioned item (2).

Advantageous Effects of Invention

The polycarbonate-based resin composition of the present invention has excellent tracking resistance and excellent flame retardancy without impairing an excellent low-temperature impact characteristic which the PC-POS copolymer has. Accordingly, the molded article obtained by molding the resin composition is suitably applied to a structure member for solar photovoltaic power generation.

DESCRIPTION OF EMBODIMENTS (Polycarbonate-Based Resin Composition)

A polycarbonate-based resin composition of the present invention includes: (A) a resin mixture formed of: a polycarbonate-polyorganosiloxane copolymer (A-1) which has a constituent unit represented by a general formula (I) and a constituent unit represented by a general formula (II); and an aromatic polycarbonate resin (A-2) except the polycarbonate-polyorganosiloxane copolymer (A-1); (B) an alkaline metal salt and/or alkaline earth metal salt of an organic sulfonic acid; (C) a polytetrafluoroethylene having a fibril-forming ability; and (D) titanium dioxide particles each having, on an outermost surface thereof, a coating layer formed of a polyol free of a nitrogen atom.

In addition, the polycarbonate-based resin composition of the present invention preferably further contains (E) a polyorganosiloxane, (F) an acidic carbon black having a pH of 6 or less, and any other additive.

Hereinafter, each component in the polycarbonate-based resin composition of the present invention is described.

(PC-POS Copolymer (A-1))

The PC-POS copolymer to be used in the present invention is a copolymer containing the constituent units represented by the general formulae (I) and (II).

The content of the constituent unit represented by the general formula (I) is preferably 70 to 98 mass %, more preferably 85 to 97.5 mass %, still more preferably 90 to 97 mass % in the PC-POS copolymer (A-1).

In addition, the content of the constituent unit represented by the general formula (II) is preferably 2 to 30 mass %, more preferably 2.5 to 15 mass %, still more preferably 3 to 10 mass % in the PC-POS copolymer (A-1). When the content is 2 mass % or more, an improving effect on the impact strength of the composition is sufficient. Meanwhile, when the content is 30 mass % or less, the composition has sufficient heat resistance.

It should be noted that the content of each constituent unit in the PC-POS copolymer (A-1) is a value calculated by nuclear magnetic resonance (NMR) measurement.

In the present invention, the average repetition number n of organosiloxane constituent units in the general formula (II) is 70 to 500, more preferably 80 to 400, still more preferably 85 to 250, still further more preferably 87 to 190. When n is less than 70, an improving effect on the impact resistance of the composition at low temperature is insufficient. When n exceeds 500, the composition is poor not only in impact resistance at low temperature as in the foregoing but also in flame retardancy. It should be noted that the value for the average repetition number n is a value calculated by nuclear magnetic resonance (NMR) measurement.

The viscosity-average molecular weight (Mv) of the PC-POS copolymer as the component (A-1) is preferably 12,000 to 50,000, more preferably 14,000 to 30,000, still more preferably 16,000 to 25,000 from the viewpoint of a balance between the strength and productivity of a molded article. It should be noted that the viscosity-average molecular weight (Mv) is a value calculated from Schnell's equation ($[\eta]=1.23\times10^{-5}\times Mv^{0.83}$) by measuring the limiting viscosity $[\eta]$ of a methylene chloride solution at 20° C.

The PC-POS copolymer as the component (A-1) is obtained by copolymerizing a dihydric phenol represented by the following general formula (1), a polyorganosiloxane represented by the following general formula (2), and phosgene, a carbonate, or a chloroformate.

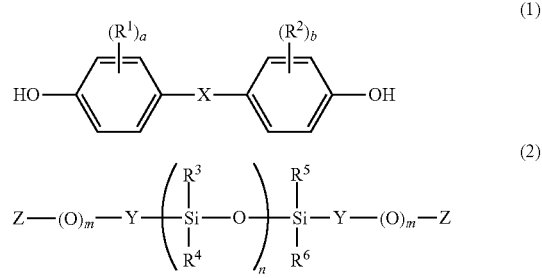

Here, in the general formula (1), $R^1$, $R^2$, X, a, and b are identical to those of the general formula (I), and in the general formula (2), $R^3$ to $R^6$, Y, and n are identical to those of the general formula (II), m represents 0 or 1, Z represents a halogen, —$R^7$OH, —$R^7$COOH, —$R^7NH_2$, —COOH, or —SH, and $R^7$ represents a linear, branched, or cyclic alkylene group, an aryl-substituted alkylene group, an aryl-substituted alkylene group that may have an alkoxy group on a ring thereof, or an arylene group.

In the polycarbonate-based resin composition of the present invention, the dihydric phenol represented by the general formula (1) to be used as a raw material for the PC-POS copolymer as the component (A-1), which is not particularly limited, is suitably 2,2-bis(4-hydroxyphenyl) propane (commonly called bisphenol A). When bisphenol A is used as the dihydric phenol, the PC-POS copolymer is such that in the general formula (I), X represents an isopropylidene group and a=b=0.

As a dihydric phenol other than bisphenol A, there are given, for example: bis(hydroxyaryl)alkanes such as bis(4-hydroxyphenyl)methane, 1,1-bis(4-hydroxyphenyl)ethane, 2,2-bis(4-hydroxyphenyl)butane, 2,2-bis(4-hydroxyphenyl) octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis (4-hydroxy-t-butylphenyl)propane, 2,2-bis(4-hydroxy-3-bromophenyl)propane, 2,2-bis(4-hydroxy-3,5-tetramethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane; bis(hydroxyaryl)cycloalkanes such as 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane; dihydroxyaryl ethers such as 4,4'-dihydroxyphenyl ether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; dihydroxydiphenyls such as 4,4'-dihydroxydiphenyl; dihydroxydiarylfluorenes such as 9,9-bis (4-hydroxyphenyl)fluorene and 9,9-bis(4-hydroxy-3-methylphenyl)fluorene; bis(4-hydroxyphenyl) diphenylmethane; dihydroxydiaryladamantanes such as 1,3-bis(4-hydroxyphenyl)adamantane, 2,2-bis(4-hydroxyphenyl)adamantane, and 1,3-bis(4-hydroxyphenyl)-5,7-dimethyladamantane; 4,4'-[1,3-phenylenebis(1-methylethylidene)]bisphenol; 10,10-bis(4-hydroxyphenyl)-9-anthrone; and 1,5-bis(4-hydroxyphenylthio)-2,3-dioxapentaene.

Those dihydric phenols may be used alone or as a mixture of two or more kinds thereof.

The polyorganosiloxane represented by the general formula (2) can be easily produced by subjecting a terminal of the polyorganosiloxane chain having a predetermined average repetition number n to a hydrosilylation reaction with a phenol having an olefinic unsaturated carbon-carbon bond, suitably vinylphenol, allylphenol, eugenol, isopropenylphenol, or the like. It is more preferred that the phenol be allylphenol or eugenol. In this case, Y in the general formula (II) of the component (A-1) represents an organic residue derived from allylphenol or eugenol.

Examples of the polyorganosiloxane represented by the general formula (2) include compounds represented by the following general formulae (3) to (11).

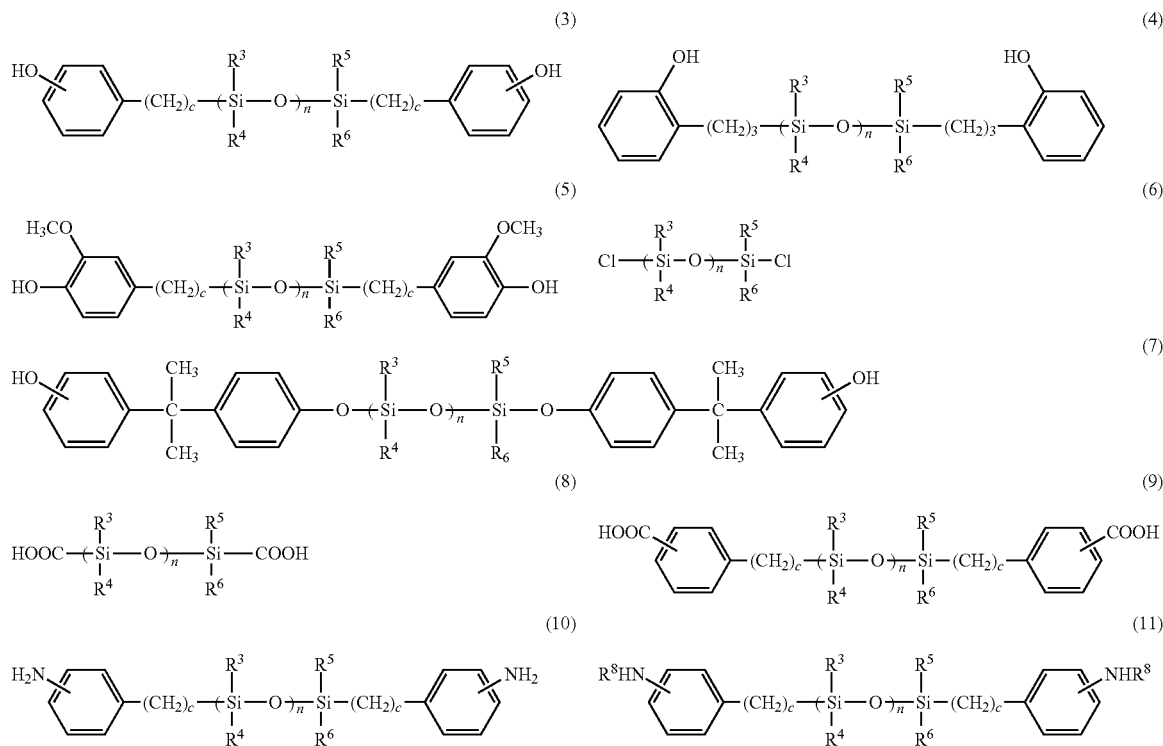

In the general formulae (3) to (11), $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms as in the general formula (II), n represents an average repetition number of organosiloxane constituent units and represents a number of 70 to 500. In addition, $R^8$ represents an alkyl, alkenyl, aryl, or aralkyl group, and c represents a positive integer and typically represents an integer of 2 to 6.

Of those, a phenol-modified polyorganosiloxane represented by the general formula (3) is preferred from the viewpoint of its ease of polymerization. In addition, an α,ω-bis[3-(o-hydroxyphenyl)propyl]polydimethylsiloxane as one kind of compounds represented by the general formula (4) or an α,ω-bis[3-(4-hydroxy-3-methoxyphenyl)propyl]polydimethylsiloxane as one kind of compounds represented by the general formula (5) is preferred from the viewpoint of its ease of availability.

The phenol-modified polyorganosiloxane can be produced by a known method. The production method is, for example, a method described below.

First, cyclotrisiloxane and disiloxane are caused to react with each other in the presence of an acid catalyst to synthesize an α,ω-dihydrogen organopolysiloxane. At this time, an α,ω-dihydrogen organopolysiloxane having a desired average repeating unit can be synthesized by changing a loading ratio between cyclotrisiloxane and disiloxane. Next, the α,ω-dihydrogen organopolysiloxane is subjected to an addition reaction with a phenol compound having an unsaturated aliphatic hydrocarbon group such as allylphenol or eugenol in the presence of a catalyst for a hydrosilylation reaction. Thus, the phenol-modified polyorganosiloxane having a desired average repeating unit can be produced.

In addition, at this stage, a low-molecular weight, cyclic polyorganosiloxane and an excess amount of the phenol compound remain as impurities. Accordingly, those low-molecular weight compounds are preferably removed by distillation through heating under reduced pressure.

(Aromatic Polycarbonate Resin Except Component (A-1) (A-2))

In the polycarbonate-based resin composition of the present invention, a product obtained by a conventional production method for an aromatic polycarbonate such as an interfacial polymerization method or a pyridine method can be used as the component (A-2) as an aromatic polycarbonate except the component (A-1). The interfacial polymerization method involves: causing a dihydric phenol-based compound and phosgene to react with each other in the presence of an organic solvent inert to the reaction and an alkaline aqueous solution; and after the reaction adding a polymerization catalyst such as a tertiary amine or a quaternary ammonium salt to perform polymerization. The pyridine method involves: dissolving the dihydric phenol-based compound in pyridine or a mixed solution of pyridine and the inert solvent; and introducing phosgene to produce the product directly.

Examples of the dihydric phenol-based compound used in the production of the aromatic polycarbonate as the component (A-2) include: bis(hydroxyaryl)alkanes such as 2,2-bis(4-hydroxyphenyl)propane (commonly called bisphenol A), bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-3-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane; bis(hydroxyaryl)cycloalkanes such as 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane; dihydroxyaryl ethers such as 4,4'-dihydroxyphenyl ether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; dihydroxydiphenyls such as 4,4'-dihydroxydiphenyl; dihydroxydiarylfluorenes such as 9,9-bis(4-hydroxyphenyl)fluorene and 9,9-bis(4-hydroxy-3-methylphenyl)fluorene; bis(4-hydroxyphenyl)diphenylmethane; dihydroxydiaryladamantanes such as 1,3-bis(4-hydroxyphenyl)adamantane, 2,2-bis(4-hydroxyphenyl)adamantane, and 1,3-bis(4-hydroxyphenyl)-5,7-dimethyladamantane; 4,4'-[1,3-phenylenebis(1-methylethylidene)]bisphenol; 10,10-bis(4-hydroxyphenyl)-9-anthrone; and 1,5-bis(4-hydroxyphenylthio)-2,3-dioxapentaene. Those dihydric phenols may be used alone or as a mixture of two or more kinds thereof.

A molecular weight modifier, an end terminator, and the like may be used as required upon production of the aromatic polycarbonate as the component (A-2). Any one of the various modifiers, terminators, and the like typically used in the polymerization of polycarbonate resins can be used as the molecular weight modifier, end terminator, and the like.

Specific examples of the molecular weight modifier include monohydric phenols such as phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-n-nonylphenol, m-nonylphenol, p-n-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-di-t-butylphenol, 2,5-dicumylphenol, 3,5-dicumylphenol, p-cresol, bromophenol, tribromophenol, monoalkyl phenols each having a linear or branched alkyl group with an average carbon atom number of 12 to 35 at an ortho-, meta-, or para-position, 9-(4-hydroxyphenyl)-9-(4-methoxyphenyl)fluorene, 9-(4-hydroxy-3-methylphenyl)-9-(4-methoxy-3-methylphenyl)fluorene, and 4-(1-adamantyl)phenol.

Of those monohydric phenols, p-t-butylphenol, p-cumylphenol, p-phenylphenol, or the like is preferred. In addition, those compounds may be used alone or in combination of two or more kinds of the compounds.

As the end terminator, a monocarboxylic acid and a derivative thereof and a monohydric phenol may be used. Examples of such end terminator may include p-tert-butyl-phenol, p-phenylphenol, p-cumylphenol, p-perfluorononylphenol, p-(perfluorononylphenyl)phenol, p-(perfluorohexylphenyl)phenol, p-tert-perfluorobutylphenol, 1-(p-hydroxybenzyl)perfluorodecane, p-[2-(1H,1H-perfluorotridodecyloxy)-1,1,1,3,3,3-hexafluoropropyl]phenol, 3,5-bis(perfluorohexyloxycarbonyl)phenol, perfluorododecyl p-hydroxybenzoate, p-(1H,1H-perfluorooctyloxy)phenol, 2H,2H,9H-perfluorononanoic acid, and 1,1,1,3,3,3-hexafluoro-2-propanol.

Further, a branching agent can be used to turn the dihydric phenol-based compound into a branched polycarbonate. The addition amount of the branching agent is preferably 0.01 to 3 mol %, more preferably 0.1 to 1.0 mol % with respect to the dihydric phenol-based compound.

Examples of the branching agent include compounds each having three or more functional groups such as 1,1,1-tris(4-hydroxyphenyl)ethane, 4,4'-[1-[4-[1-(4-hydroxyphenyl)-1-methylethyl]phenyl]ethylidene]bisphenol, α,α',α"-tris(4-hydroxyphenyl)-1,3,5-triisopropylbenzene, 1-[α-methyl-α-

(4'-hydroxyphenyl)ethyl]-4-[α',α'-bis(4''-hydroxyphenyl) ethyl]benzene, phloroglucin, trimellitic acid, and isatinbis(o-cresol).

The content of the component (A-1) in the resin mixture (A) formed of the component (A-1) and the component (A-2) is 30 to 100 mass %, preferably 45 to 100 mass %, more preferably 60 to 100 mass %, meanwhile, the content of the component (A-2) is 70 to 0 mass %, preferably 55 to 0 mass %, more preferably 40 to 0 mass %.

When the content of the component (A-1) is less than 30 mass % or the content of the component (A-2) exceeds 70 mass %, the content of a polyorganosiloxane block moiety as the constituent unit represented by the general formula (II) needs to be increased at the time of the production of the component (A-1) for increasing the content of the polyorganosiloxane block moiety in the resin mixture (A) to improve the low-temperature impact strength of the composition. However, increasing the content at the time of the production of the component (A-1) may reduce the uniformity of the reaction in the polymerizing step, and may deteriorate the separability of a polymer and washing water in the step of washing the polymer, and hence the productivity of the component (A-1) largely reduces.

The content of the polyorganosiloxane block moiety as the constituent unit represented by the general formula (II) is preferably 2 to 30 mass %, more preferably 2.5 to 15 mass %, still more preferably 3 to 10 mass % in the resin mixture (A) formed of the component (A-1) and the component (A-2). When the content is 2 mass % or more, the improving effect on the impact strength is sufficient. Meanwhile, when the content is 30 mass % or less, the composition has sufficient heat resistance.

((B) Alkaline (Earth) Metal Salt of Organic Sulfonic Acid)

In the present invention, the alkaline metal salt and/or alkaline earth metal salt of the organic sulfonic acid (hereinafter sometimes referred to as "organic sulfonic acid alkaline (earth) metal salt") are each/is blended as the component (B) into the composition for improving its flame retardancy.

The alkaline (earth) metal salt of the organosulfonic acid is an alkaline metal salt or alkaline earth metal salt of an organosulfonic acid having at least one carbon atom, though examples thereof include various salts.

Examples of the organic sulfonic acid include an alkylsulfonic acid, benzenesulfonic acid, an alkylbenzenesulfonic acid, diphenylsulfonic acid, naphthalenesulfonic acid, 2,5-dichlorobenzenesulfonic acid, 2,4,5-trichlorobenzenesulfonic acid, diphenylsulfone-3-sulfonic acid, diphenylsulfone-3,3'-disulfonic acid, naphthalenetrisulfonic acid, and fluorine-substituted products of these acids, and a polystyrenesulfonic acid.

Of those, a perfluoroalkanesulfonic acid, diphenylsulfonic acid, and a polystyrenesulfonic acid are preferred, and a perfluoroalkanesulfonic acid and a polystyrenesulfonic acid are more preferred.

Examples of the alkaline metal salt include salts of metals such as sodium, potassium, lithium, and cesium, and examples of the alkaline earth metal salt include salts of metals such as magnesium, calcium, strontium, and barium. Of those salts of metals, a sodium, potassium, or cesium salt is preferred, and a potassium salt is more preferred.

As the component (B), an alkaline metal salt and/or alkaline earth metal salt of a perfluoroalkanesulfonic acid or a polystyrenesulfonic acid are/is preferred.

As the alkali (earth) metal salt of a perfluoroalkanesulfonic acid, there is given a salt represented by the following general formula (12).

$$(C_dF_{2d+1}SO_3)_eM \quad (12)$$

In the formula (12), d represents an integer of 1 to 10, M represents an alkaline metal such as lithium, sodium, potassium, or cesium; or an alkaline earth metal such as magnesium, calcium, strontium, or barium, and e represents the valence of M.

For example, metal salts described in JP 47-40445 B correspond to these metal salts.

Examples of the perfluoroalkanesulfonic acid represented by the general formula (12) include perfluoromethanesulfonic acid, perfluoroethanesulfonic acid, perfluoropropanesulfonic acid, perfluorobutanesulfonic acid, perfluoromethylbutanesulfonic acid, perfluorohexanesulfonic acid, perfluoroheptanesulfonic acid, and perfluorooctanesulfonic acid. A sodium, potassium, or cesium salt of any such perfluoroalkanesulfonic acid is preferably used, and a potassium salt thereof is more preferably used.

The alkaline (earth) metal salt of the polystyrene sulfonic acid is, for example, an alkaline (earth) metal salt of a sulfonate group-containing aromatic vinyl-based resin represented by the following general formula (13).

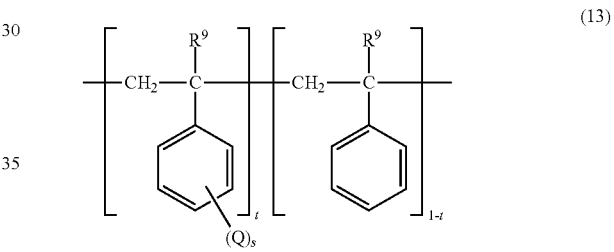

In the formula (13), Q represents a sulfonate group, $R^9$ represents a hydrogen atom or a hydrocarbon group having 1 to 10 carbon atoms, s represents an integer of 1 to 5, and t represents a molar fraction and falls within the range of $0<t\le1$.

In this case, the sulfonate group Q is an alkaline metal salt and/or alkaline earth metal salt of a sulfonic acid, and examples of the metals include alkaline metals such as sodium, potassium, lithium, rubidium, and cesium; and alkaline earth metals such as beryllium, magnesium, calcium, strontium, and barium. Of those, a sodium, potassium, or cesium salt is preferred, and a potassium salt is more preferred.

In addition, $R^9$ represents a hydrogen atom or a hydrocarbon group having 1 to 10 carbon atoms, preferably a hydrogen atom or a methyl group.

s represents an integer of 1 to 5 and t satisfies a relationship of $0<t\le1$. Therefore, the metal salt may contain an aromatic ring that is totally substituted or partially substituted with the sulfonate group (Q).

The content of the alkaline (earth) metal salt of the organosulfonic acid as the component (B) is 0.01 to 0.15 part by mass, preferably 0.02 to 0.13 part by mass, more preferably 0.03 to 0.12 part by mass with respect to 100 parts by mass of the resin mixture (A). When the content is less than 0.01 part by mass or more than 0.15 part by mass, the flame retardancy cannot be sufficiently improved.

((C) Polytetrafluoroethylene)

In the present invention, the polytetrafluoroethylene (hereinafter sometimes referred to as "PTFE") having a fibril-forming ability is blended as the component (C) for imparting a melt dripping-preventing effect to the resin composition to improve its flame retardancy.

Herein, the term "fibril-forming ability" refers to a state where the molecules of a resin show the following tendency: the molecules are bonded to each other by an external action such as a shear force so as to be fibrous.

The PTFE having a fibril-forming ability has an extremely high molecular weight, and has a number-average molecular weight of generally 500,000 or more, preferably 500,000 to 15,000,000, more preferably 1,000,000 to 10,000,000, which is determined from a standard specific gravity.

Such PTFE may be obtained, for example, by subjecting tetrafluoroethylene to polymerization in an aqueous solvent in the presence of sodium, potassium, or ammonium peroxydisulfate under a pressure of 6.9 to 690 kPa (1 to 100 psi) at a temperature of 0 to 200° C., preferably 20 to 100° C.

In the polymerization, a fluorine-containing olefin such as hexafluoropropylene, chlorotrifluoroethylene, a fluoroalkylethylene, or a perfluoroalkyl vinyl ether; or a fluorine-containing alkyl (meth)acrylate such as a perfluoroalkyl (meth) acrylate may be used as a component for copolymerization in such a range that the characteristics of the polytetrafluoroethylene are not impaired. The content of such component for copolymerization is preferably 10 mass % or less with respect to tetrafluoroethylene in the polytetrafluoroethylene.

The PTFE is preferably a PTFE particle from the viewpoint of homogeneous dispersion into the polycarbonate. The particle diameter of the PTFE particle is generally 10 μm or less, preferably 0.05 to 1.0 μm.

For example, commercially available products classified into Type 3 by the ASTM standard can each be used as the PTFE having a fibril-forming ability. Examples of the commercially available products classified into Type 3 include a Teflon (trademark) 6-J (trade name, manufactured by DU PONT-MITSUI FLUOROCHEMICALS COMPANY, LTD.), a POLYFLON D-1 and a POLYFLON F-103 (trade names, manufactured by DAIKIN INDUSTRIES, LTD.), and a CD-076 (trade name, manufactured by ASAHI GLASS CO., LTD.). In addition, commercially available products except the commercially available products classified into Type 3 include an Algoflon F5 (trade name, manufactured by Montefluos) and a POLYFLON MPA and a POLYFLON FA-100 (trade names, manufactured by DAIKIN INDUSTRIES, LTD.).

Those PTFEs may be used alone or in combination of two or more kinds thereof.

The blending amount of the PTFE (C) having a fibril-forming ability is 0.1 to 1 part by mass, preferably 0.2 to 0.8 part by mass, more preferably 0.25 to 0.5 part by mass with respect to 100 parts by mass of (A) the resin mixture. When the blending amount is less than 0.1 part by mass, the flame retardancy cannot be sufficiently improved. On the other hand, when the blending amount exceeds 1 part by mass, the low-temperature impact strength becomes poor.

((D) Titanium Dioxide Particles)

In the present invention, the titanium dioxide particles each having, on its outermost surface, a coating layer formed of a polyol free of a nitrogen atom (hereinafter sometimes simply referred to as "titanium dioxide particles") are blended as the component (D) into the composition for establishing an excellent balance between its low-temperature impact strength and tracking resistance.

The primary particle diameters of such titanium dioxide particles are each preferably 0.05 to 0.5 μm, more preferably 0.1 to 0.4 μm, still more preferably 0.15 to 0.3 μm.

The outermost surface of each of the titanium dioxide particles to be used in the present invention is coated with the polyol free of a nitrogen atom, and hence the particles can prevent a reduction in impact strength of the resin composition.

It has been known that in the surface treatment of the titanium dioxide particles with an organic compound, their surfaces are coated with, for example, an organosilicon compound, alkanolamines, and higher fatty acids. However, the inventors of the present invention have found that the titanium dioxide particles each having, on its outermost surface, the coating layer formed of the polyol free of a nitrogen atom are particularly preferred from the foregoing viewpoint.

The surface of each of the titanium dioxide particles to be used in the present invention may be coated with a hydrous oxide and/or oxide of at least one kind of element containing an element such as aluminum, silicon, magnesium, zirconia titanium, or tin before the surface of each of the titanium dioxide particles is coated with the polyol free of a nitrogen atom.

Examples of the polyol free of a nitrogen atom with which the outermost surface of each of the titanium dioxide particles is coated include trimethylolpropane, trimethylolethane, ditrimethylolpropane, trimethylolpropane ethoxylate, and pentaerythritol. Of those, trimethylolpropane or trimethylolethane is preferred from the following viewpoint. By used trimethylolpropane or trimethylolethane, the resin composition can prevent the reduction of the impact strength. It should be noted that one kind of those polyols can be used alone, or two or more kinds thereof can be used in combination.

A method of coating the outermost surface of each of the titanium dioxide particles with the polyol free of a nitrogen atom is, for example, a wet method or a dry method. The wet method involves adding titanium dioxide to a mixed liquid of the polyol free of a nitrogen atom and a low-boiling point solvent, stirring the mixture, and removing the low-boiling point solvent after the stirring to coat the outermost surface of each particle of titanium dioxide with the polyol. The dry method involves mixing the polyol free of a nitrogen atom and titanium dioxide in a mixer such as a Henschel mixer or a tumbler, or spraying titanium dioxide with a mixed solution prepared by dissolving or dispersing the polyol free of a nitrogen atom in a solvent, to coat the outermost surface of each particle of titanium dioxide with the polyol.

With regard to a method of producing titanium dioxide, one produced by any one of a chlorine method and a sulfuric acid method can be used. In addition, any one of a rutile-type crystalline structure and an anatase-type crystalline structure can be used for titanium dioxide, but the rutile-type crystalline structure is preferred from the viewpoints of, for example, the heat stability and light fastness of the polycarbonate-based resin composition.

The blending amount of the titanium dioxide particles (D) is 2 to 15 parts by mass, preferably 3 to 10 parts by mass, more preferably 4 to 7 parts by mass with respect to 100 parts by mass of (A) the resin mixture. When the blending amount is less than 2 parts by mass, the tracking resistance becomes poor. When the blending amount exceeds 15 parts by mass, the low-temperature impact strength becomes poor.

((E) Polyorganosiloxane)

In the present invention, the polyorganosiloxane is preferably further incorporated as the component (E) for preventing the deterioration of the resin composition to maintain its characteristics such as a mechanical strength, stability, and heat resistance.

Examples of such polyorganosiloxane include, but not particularly limited to, an alkyl hydrogen silicone and an alkoxysilicone.

Examples of the alkyl hydrogen silicone include methyl hydrogen silicone and ethyl hydrogen silicone. On the other hand, examples of the alkoxysilicone include methoxysilicone and ethoxysilicone.

Of those, an alkoxysilicone is preferred. The alkoxysilicone is a silicone compound containing an alkoxysilyl group obtained by bonding an alkoxy group to a silicon atom directly or through a divalent hydrocarbon group, and examples thereof include a linear polyorganosiloxane, a cyclic polyorganosiloxane, a network polyorganosiloxane, and a partially branched linear polyorganosiloxane. Of those, a linear polyorganosiloxane is preferred, and a polyorganosiloxane having a molecular structure in which an alkoxy group is bonded to a silicone main chain through a methylene chain is more preferred.

As such component (E), there may be suitably used, for example, commercially available products SH1107, SR2402, BY16-160, BY16-161, BY16-160E, and BY16-161E manufactured by Dow Corning Toray Co., Ltd.

The content of the polyorganosiloxane (E) is preferably 0.05 to 0.30 part by mass, more preferably 0.05 to 0.20 part by mass, still more preferably 0.07 to 0.15 part by mass with respect to 100 parts by mass of (A) the resin mixture. When the content is 0.05 part by mass or more, the deterioration of the polycarbonate resin hardly occurs and hence a reduction in molecular weight of the resin can be suppressed. In addition, when the content is 0.30 part by mass or less, balanced economic efficiency is achieved. In addition, silver does not occur on the surface of a molded article and hence the external appearance of the molded article becomes good.

((F) Acidic Carbon Black)

In the present invention, when the composition is used in the application of a structure member for solar photovoltaic power generation, the acidic carbon black having a pH of 6 or less is preferably further blended as the component (F).

The pH of the acidic carbon black as the component (F) is preferably 6 or less, more preferably 4 or less from the viewpoint of the maintenance of the tracking resistance. A commercial product can be used as such acidic carbon black and is, for example, an MA100R (manufactured by Mitsubishi Chemical Corporation, pH: 3.5).

The blending amount of (F) the acidic carbon black is preferably 0.5 to 3 parts by mass, more preferably 0.7 to 2.5 parts by mass, still more preferably 0.8 to 1.5 parts by mass with respect to 100 parts by mass of (A) the resin mixture. When the blending amount is 0.5 part by mass or more, even in the case where the composition is used in the application of a structure member for solar photovoltaic power generation, the composition can be a molded article having a black body that can be used without problems. In addition, when the blending amount is 3 parts by mass or less, the tracking resistance does not reduce.

(Other Additives)

The polycarbonate-based resin composition of the present invention can be blended with various known additives conventionally added to a polycarbonate-based resin composition as required in such a range that the effect of the present invention is not impaired in addition to the above-mentioned components (A) to (F). Examples of those additives include a reinforcing material, a filler, a stabilizer, an antioxidant, a UV absorber, an antistatic agent, a lubricant, a release agent, a dye, a pigment, and any other flame retardant or any other elastomer for an impact resistance improvement.

The content of those other additives is generally 0 to 1 part by mass, preferably 0 to 0.5 part by mass with respect to 100 parts by mass of (A) the resin mixture.

(Molded Article)

A molded article formed of the polycarbonate-based resin composition of the present invention is obtained by molding a product obtained by blending and kneading the foregoing respective components.

A method for the kneading is not particularly limited and examples thereof include methods involving using a ribbon blender, a Henschel mixer, a Banbury mixer, a drum tumbler, a single-screw extruder, a twin-screw extruder, a co-kneader, and a multi-screw extruder. A heating temperature during the kneading is selected from the range of generally 240 to 330° C., preferably 250 to 320° C.

Various conventionally known molding methods such as an injection molding method, an injection compression molding method, an extrusion molding method, a blow molding method, a press molding method, a vacuum molding method, and an expansion molding method can be employed for the molding.

It should be noted that a component to be incorporated except the polycarbonate resin can be melted and kneaded with the polycarbonate resin or any other thermoplastic resin in advance, i.e., can be added as a master batch.

In addition, the kneaded product is preferably pelletized and injection-molded. A general injection molding method or injection compression molding method, and a special molding method such as a gas-assisted molding method can be employed, and hence various molded articles can be produced.

In addition, when the molded article of the invention of the present application is used as an external appearance member, a molding technology for improving an external appearance such as a heat cycle molding method, a high-temperature mold, or an insulated runner mold is preferably employed.

In addition, when a part is required to be made flame-retardant, a molding technology such as laminate molding or two-color molding with a resin material having flame retardancy is preferably employed.

Insert molding or outsert molding becomes an effective method when a molding machine has a high-temperature heat source because performing the insert molding or outsert molding of a metal part can improve the efficiency of heat transfer from the heat source.

In order that a large and thin injection-molded article may be obtained, injection compression molding, or high-pressure or ultrahigh-pressure injection molding is preferably employed. And, partial compression molding or the like can be employed in the molding of a molded article having a partial thin portion.

(Structure Member for Solar Photovoltaic Power Generation)

The polycarbonate-based resin composition of the present invention has tracking resistance and excellent flame retardancy without impairing a low-temperature impact characteristic. Accordingly, a molded article obtained by molding the resin composition is suitable as a structure member for solar photovoltaic power generation such as a junction box for solar photovoltaic power generation to be placed outdoors.

EXAMPLES

Methods of measuring a "viscosity number" and a "viscosity-average molecular weight" in Examples and Comparative Examples of the present invention, and methods of evaluating the resultant polycarbonate-based resin composition for its performances are as described below.
(Viscosity Number)
Measurement was performed in conformity with ISO 1628-4 (1999).
(Viscosity-Average Molecular Weight (Mv))
A produced polycarbonate-polyorganosiloxane copolymer was dissolved in methylene chloride, and then the viscosity-average molecular weight was calculated from the following relational expression (Schnell's equation) by measuring the limiting viscosity [η] of the methylene chloride solution at 20° C. with an Ubbelohde-type viscosity tube.

$$[\eta] = 1.23 \times 10^{-5} \times M_v^{0.83}$$

(Methods of Evaluating Polycarbonate-Based Resin Composition for its Performances)
(1) Impact Test (Impact Strength)
A notched Izod impact test was performed in conformity with ASTM D256 at 23° C. and −30° C.
(2) Tracking Resistance
A comparative tracking index (CTI value) was determined in accordance with a test method described in the IEC Publication 112 standard. The CTI value becomes more excellent as an applied voltage at the time of the test enlarges. The value is measured at an applied voltage in the range of 0 V to 600 V, and the applied voltage is ranked as described below according to UL746A.
CTI rank 0: 600 V≤CTI value
CTI rank 1: 400 V≤CTI value<600 V
CTI rank 2: 250 V≤CTI value<400 V
CTI rank 3: 170 V≤CTI value<250 V
CTI rank 4: 100 V≤CTI value<170 V
CTI rank 5: 0 V≤CTI value<100 V
(3) Combustibility
A vertical flame test was performed with test pieces (each having a length of 12.7 mm, a width of 12.7 mm, and a thickness of 3.2 mm) produced in conformity with the UL standard 94. The test pieces were evaluated for their flame retardancy by being classified into classes "V-0," "V-1," and "V-2." It should be noted that the UL standard 94 is a method of evaluating a test piece having a predetermined size, which is held vertically, for its flame retardancy on the basis of an afterflame time after the flame of a burner has been brought into contact with the test piece for 10 seconds.

Production Example 1

(1) Synthesis of Polycarbonate Oligomer
Added to a 5.6-mass % aqueous sodium hydroxide were 2,000 ppm by mass of sodium dithionite with respect to bisphenol A to be dissolved later. Bisphenol A was dissolved in the solution so that the concentration of bisphenol A became 13.5 mass %. Thus, a solution of bisphenol A in aqueous sodium hydroxide was prepared.
The solution of bisphenol A in aqueous sodium hydroxide, methylene chloride, and phosgene were continuously passed through a tubular reactor having an inner diameter of 6 mm and a tube length of 30 m at flow rates of 40 L/hr, 15 L/hr, and 4.0 kg/hr, respectively. The tubular reactor had a jacket portion and the temperature of a reaction liquid was kept at 40° C. or less by passing cooling water through the jacket.
The reaction liquid that had exited the tubular reactor was continuously introduced into a baffled vessel-type reactor having an internal volume of 40 L provided with a sweptback blade, and then 2.8 L/hr of the solution of bisphenol A in aqueous sodium hydroxide, 0.07 L/hr of a 25-mass % aqueous sodium hydroxide, 17 L/hr of water, and 0.64 L/hr of a 1-mass % aqueous solution of triethylamine were further added to the reactor to perform a reaction. The reaction liquid flowing out of the vessel-type reactor was continuously extracted, and then an aqueous phase was separated and removed by leaving the liquid at rest, followed by the collection of a methylene chloride phase.
The concentration of the polycarbonate oligomer thus obtained was 329 g/L and the concentration of a chloroformate group was 0.74 mol/L.
(2) Synthesis of Polycarbonate-polyorganosiloxane Copolymer
15 Liters of the polycarbonate oligomer solution produced in the above section (1), 8.9 L of methylene chloride, 411 g of a 2-allylphenol terminal-modified polydimethylsiloxane (PDMS-1) in which the average repetition number of dimethylsiloxy units was 90, and 8.8 mL of triethylamine were loaded into a 50-L vessel-type reactor provided with a baffle board, a paddle-type stirring blade, and a cooling jacket. While the mixture was stirred, 1,389 g of a 6.4-mass % aqueous sodium hydroxide were added to the mixture to perform a reaction between the polycarbonate oligomer and the 2-allylphenol terminal-modified polydimethylsiloxane for 10 minutes.
A solution of p-t-butylphenol (PTBP) in methylene chloride (prepared by dissolving 132 g of p-t-butylphenol in 2.0 L of methylene chloride) and a solution of bisphenol A in aqueous sodium hydroxide (prepared by dissolving 1,012 g of bisphenol A in an aqueous solution prepared by dissolving 577 g of sodium hydroxide and 2.0 g of sodium dithionite in 8.4 L of water) were added to the polymer liquid to perform a polymerization reaction for 50 minutes. 10 Liters of methylene chloride were added to the resultant to dilute the resultant, and then the mixture was stirred for 10 minutes. After that, the mixture was separated into an organic phase containing a polycarbonate, and an aqueous phase containing excessive amounts of bisphenol A and sodium hydroxide, and then the organic phase was isolated.
The solution of the polycarbonate-polydimethylsiloxane copolymer in methylene chloride thus obtained was sequentially washed with a 0.03-mol/L aqueous sodium hydroxide and 0.2-mol/L hydrochloric acid in amounts of 15 vol % each with respect to the solution. Next, the solution was repeatedly washed with pure water until an electric conductivity in an aqueous phase after the washing became 0.01 μS/m or less. The solution of the polycarbonate-polydimethylsiloxane copolymer in methylene chloride obtained by the washing was concentrated and pulverized, and then the resultant flake was dried under reduced pressure at 120° C.
The polycarbonate-polyorganosiloxane copolymer (polycarbonate-polydimethylsiloxane copolymer: PC-PDMS copolymer) obtained as described above is defined as a PC-PDMS copolymer A-1-1. The PC-PDMS copolymer A-1-1 had an amount of a polydimethylsiloxane residue (content of a PDMS block moiety) determined by NMR measurement of 6.0 mass %, a viscosity number of 49.5, and a viscosity-average molecular weight (Mv) of 18,500.

Production Examples 2 to 5

PC-PDMS copolymers A-1-2 to 5 were synthesized by changing the kind of the polydimethylsiloxane, the usage of the polydimethylsiloxane, and the usage of p-t-butylphenol as shown in Table 1. Table 1 shows the physical property values of the copolymers.

TABLE 1

|  | Unit | Production Example 1 | Production Example 2 | Production Example 3 | Production Example 4 | Production Example 5 |
|---|---|---|---|---|---|---|
| PC-PDMS copolymer |  | A-1-1 | A-1-2 | A-1-3 | A-1-4 | A-1-5 |
| Average repetition number n of constituent units in general formula (II) | — | 90 | 40 | 150 | 300 | 700 |
| Usage of PDMS | g | 411 | 411 | 411 | 411 | 411 |
| Usage of PTBP | g | 132 | 132 | 132 | 132 | 132 |
| Amount of PDMS residue | mass % | 6 | 6 | 6 | 6 | 6 |
| Viscosity number | ml/g | 49.5 | 49.5 | 49.5 | 49.5 | 49.5 |
| Viscosity-average molecular weight Mv | — | 18,500 | 18,500 | 18,500 | 18,500 | 18,500 |

Examples 1 to 13 and Comparative Examples 1 to 11

Polycarbonate-based resin compositions were obtained by mixing components (A) to (F) at blending ratios shown in Table 2 and Table 3. The components (A) to (F) used are as described below.

(A-1): PC-PDMS copolymers obtained in Production Examples 1 to 5 shown in Table 1.

(A-2): Product name "TARFLON FN1900A" (manufactured by Idemitsu Kosan Co., Ltd., bisphenol A polycarbonate having p-t-butylphenol as end group, viscosity number: 49.5, viscosity-average molecular weight (Mv): 18,500).

(B): Product name "Megaface F114" (manufactured by DIC Corporation, potassium perfluoroalkanesulfonate).

(C): Product name "CD076" (manufactured by ASAHI GLASS CO., LTD., powder of polytetrafluoroethylene having a fibril-forming ability).

(D-1): Titanium dioxide having an average particle diameter of 0.21 µm which is subjected to an organic surface treatment with a polyol (trimethylolpropane) and whose outermost surface is coated with trimethylolpropane (product name: "CR60-2," manufactured by ISHIHARA SANGYO KAISHA, LTD.)

(D-2): Titanium dioxide whose outermost surface is coated with trimethylolpropane by adding 1 part by mass of trimethylolpropane to titanium dioxide having an average particle diameter of 0.21 µm whose surface is coated with alumina (product name: "CR-60," manufactured by ISHIHARA SANGYO KAISHA, LTD.), mixing the contents with a Henschel mixer for 30 minutes, and then subjecting the mixture to a heat treatment at 150° C. for 3 hours (D-3): Titanium dioxide whose outermost surface is coated with trimethylolethane by adding 1 part by mass of trimethylolethane to titanium dioxide having an average particle diameter of 0.21 µm whose surface is coated with alumina (product name: "CR-60," manufactured by ISHIHARA SANGYO KAISHA, LTD.), mixing the contents with a Henschel mixer for 30 minutes, and then subjecting the mixture to a heat treatment at 150° C. for 3 hours (D-4): Titanium dioxide having an average particle diameter of 0.21 µm whose outermost surface is coated with alumina (product name: "CR-60," manufactured by ISHIHARA SANGYO KAISHA, LTD.)

(D-5): Titanium dioxide whose outermost surface is coated with dimethylpolysiloxane by adding 1 part by mass of dimethylpolysiloxane to titanium dioxide having an average particle diameter of 0.21 µm whose surface is coated with alumina (product name: "CR-60," manufactured by ISHIHARA SANGYO KAISHA, LTD.), mixing the contents with a Henschel mixer for 30 minutes, and then subjecting the mixture to a heat treatment at 150° C. for 3 hours (D-6): Titanium dioxide whose outermost surface is coated with triethanolamine by adding 1 part by mass of triethanolamine to titanium dioxide having an average particle diameter of 0.21 µm whose surface is coated with alumina (product name: "CR-60," manufactured by ISHIHARA SANGYO KAISHA, LTD.), mixing the contents with a Henschel mixer for 30 minutes, and then subjecting the mixture to a heat treatment at 150° C. for 3 hours (E): Product name "BY-16-161" (manufactured by Dow Corning Toray Co., Ltd., siloxane containing a methoxysilyl group in which a methoxy group is bonded to a silicon atom via a divalent hydrocarbon group).

(F): Product name "MA100R" (manufactured by Mitsubishi Chemical Corporation, acidic carbon black having a pH of 3.5).

Each resin composition was mixed with 0.10 part by mass of tris(2,4-di-tert-butylphenyl)phosphite (manufactured by BASF, trade name: "Irgafos 168") as an antioxidant with respect to 100 parts by mass of the component (A), and then the contents were melted and kneaded with a vented biaxial extruder (manufactured by TOSHIBA MACHINE CO., LTD., model name: "TEM-35B") at a resin temperature of 290° C. to provide a pellet of each polycarbonate-based resin composition.

The polycarbonate-based resin composition pellet was injection-molded with an injection molding machine under the molding conditions of a cylinder temperature of 280° C. and a mold temperature of 80° C. to provide a test piece. The resultant test piece was measured for its impact strengths at 23° C. and −30° C., tracking resistance, and flame retardancy by the foregoing methods. Tables 2 and 3 show the results.

TABLE 2-1

|  |  |  | Unit | Example | | | | | | |
|---|---|---|---|---|---|---|---|---|---|---|
|  |  |  |  | 1 | 2 | 3 | 4 | 5 | 6 | 7 |
| (A-1) | PC-PDMS copolymer |  |  | A-1-1 | A-1-1 | A-1-1 | A-1-1 | A-1-1 | A-1-1 | A-1-1 |
|  |  |  | mass % | 80 | 80 | 80 | 100 | 50 | 80 | 80 |
|  | Average repetition number n of PDMS |  |  | 90 | 90 | 90 | 90 | 90 | 90 | 90 |
|  | Content of PDMS block moiety |  | mass % | 6 | 6 | 6 | 6 | 6 | 6 | 6 |
| (A-2) | Aromatic polycarbonate resin except component (A-1) |  | mass % | 20 | 20 | 20 | 0 | 50 | 20 | 20 |
|  | Content of PDMS block moiety in component (A-1) + component (A-2) |  | mass % | 4.8 | 4.8 | 4.8 | 6 | 3 | 4.8 | 4.8 |

TABLE 2-1-continued

|  |  | Unit | Example 1 | 2 | 3 | 4 | 5 | 6 | 7 |
|---|---|---|---|---|---|---|---|---|---|
| (B) | Alkaline (earth) metal salt of organic sulfonic acid | part(s) by mass | 0.03 | 0.03 | 0.03 | 0.03 | 0.03 | 0.1 | 0.03 |
| (C) | Polytetrafluoroethylene | part(s) by mass | 0.3 | 0.3 | 0.3 | 0.3 | 0.3 | 0.3 | 0.5 |
| (D) | D-1: titanium dioxide-1 (coated with trimethylolpropane) | part(s) by mass | 5 | — | — | — | — | — | — |
|  | D-2: titanium dioxide-2 (coated with trimethylolpropane) | part(s) by mass | — | 5 | — | 5 | 5 | 5 | 5 |
|  | D-3: titanium dioxide-3 (coated with trimethylolethane) | part(s) by mass | — | — | 5 | — | — | — | — |
| (E) | Polyorganosiloxane | part(s) by mass | 0.1 | 0.1 | 0.1 | 0.1 | 0.1 | 0.1 | 0.1 |
| (F) | Carbon black | part(s) by mass | 1 | 1 | 1 | 1 | 1 | 1 | 1 |
| Evaluation | Notched Izod impact strength at 23° C. | kJ/m$^2$ | 78 | 76 | 77 | 74 | 75 | 78 | 75 |
|  | Notched Izod impact strength at −30° C. | kJ/m$^2$ | 51 | 50 | 50 | 47 | 48 | 50 | 49 |
|  | Tracking resistance (performance classification rank) |  | 2 | 2 | 2 | 2 | 2 | 2 | 2 |
|  | UL94 combustibility (1/16 inch) |  | V-0 | V-0 | V-0 | V-0 | V-0 | V-0 | V-0 |

TABLE 2-2

|  |  | Unit | Example 8 | 9 | 10 | 11 | 12 | 13 |
|---|---|---|---|---|---|---|---|---|
| (A-1) | PC-PDMS copolymer |  | A-1-1 | A-1-1 | A-1-1 | A-1-3 | A-1-4 | A-1-1 |
|  |  | mass % | 80 | 80 | 80 | 80 | 80 | 80 |
|  | Average repetition number n of PDMS |  | 90 | 90 | 90 | 150 | 300 | 90 |
|  | Content of PDMS block moiety | mass % | 6 | 6 | 6 | 6 | 6 | 6 |
| (A-2) | Aromatic polycarbonate resin except component (A-1) | mass % | 20 | 20 | 20 | 20 | 20 | 20 |
|  | Content of PDMS block moiety in component (A-1) + component (A-2) | mass % | 4.8 | 4.8 | 4.8 | 4.8 | 4.8 | 4.8 |
| (B) | Alkaline (earth) metal salt of organic sulfonic acid | part(s) by mass | 0.03 | 0.03 | 0.03 | 0.03 | 0.03 | 0.03 |
| (C) | Polytetrafluoroethylene | part(s) by mass | 0.8 | 0.3 | 0.3 | 0.3 | 0.3 | 0.3 |
| (D) | D-1: titanium dioxide-1 (coated with trimethylolpropane) | part(s) by mass | — | — | — | 5 | 5 | 5 |
|  | D-2: titanium dioxide-2 (coated with trimethylolpropane) | part(s) by mass | 5 | 3 | 10 | — | — | — |
|  | D-3: titanium dioxide-3 (coated with trimethylolethane) | part(s) by mass | — | — | — | — | — | — |
| (E) | Polyorganosiloxane | part(s) by mass | 0.1 | 0.1 | 0.1 | 0.1 | 0.1 | — |
| (F) | Carbon black | part(s) by mass | 1 | 1 | 1 | 1 | 1 | 1 |
| Evaluation | Notched Izod impact strength at 23° C. | kJ/m$^2$ | 74 | 76 | 69 | 70 | 73 | 72 |
|  | Notched Izod impact strength at −30° C. | kJ/m$^2$ | 47 | 50 | 45 | 48 | 49 | 45 |
|  | Tracking resistance (performance classification rank) |  | 2 | 2 | 2 | 2 | 2 | 2 |
|  | UL94 combustibility (1/16 inch) |  | V-0 | V-0 | V-0 | V-0 | V-0 | V-0 |

TABLE 3-1

|  |  | Unit | Comparative Example 1 | 2 | 3 | 4 | 5 | 6 |
|---|---|---|---|---|---|---|---|---|
| (A-1) | PC-PDMS copolymer |  | A-1-1 | A-1-1 | A-1-1 | A-1-1 | A-1-1 | A-1-1 |
|  |  | mass % | 80 | 80 | 80 | 80 | 80 | 80 |
|  | Average repetition number n of PDMS |  | 90 | 90 | 90 | 90 | 90 | 90 |
|  | Content of PDMS block moiety | mass % | 6 | 6 | 6 | 6 | 6 | 6 |
| (A-2) | Aromatic polycarbonate resin except component (A-1) | mass % | 20 | 20 | 20 | 20 | 20 | 20 |
|  | Content of PDMS block moiety in component (A-1) + component (A-2) | mass % | 4.8 | 4.8 | 4.8 | 4.8 | 4.8 | 4.8 |
| (B) | Alkaline (earth) metal salt of organic sulfonic acid | part(s) by mass | 0.03 | 0.03 | 0.03 | 0.03 | 0.03 | 0.03 |
| (C) | Polytetrafluoroethylene | part(s) by mass | 0.3 | 0.3 | 0.3 | 0.3 | 0.3 | 1.5 |
| (D) | D-1: titanium dioxide-1 (coated with trimethylolpropane) | part(s) by mass | — | — | — | 1 | 25 | — |
|  | D-2: titanium dioxide-2 (coated with trimethylolpropane) | part(s) by mass | — | — | — | — | — | 5 |
|  | D-3: titanium dioxide-3 (coated with trimethylolethane) | part(s) by mass | — | — | — | — | — | — |

TABLE 3-1-continued

|     |     |     | Comparative Example | | | | | |
|---|---|---|---|---|---|---|---|---|
|     |     | Unit | 1 | 2 | 3 | 4 | 5 | 6 |
| (d) | d-4: titanium dioxide-4 (coated with alumina) | part(s) by mass | 5 | — | — | — | — | — |
|     | d-5: titanium dioxide-5 (coated with dimethylpolysiloxane) | part(s) by mass | — | 5 | — | — | — | — |
|     | d-6: titanium dioxide-6 (coated with triethanolamine) | part(s) by mass | — | — | 5 | — | — | — |
| (E) | Polyorganosiloxane | part(s) by mass | 0.1 | 0.1 | 0.1 | 0.1 | 0.1 | 0.1 |
| (F) | Carbon black | part(s) by mass | 1 | 1 | 1 | 1 | 1 | 1 |
| Evaluation | Notched Izod impact strength at 23° C. | kJ/m$^2$ | 59 | 59 | 57 | 78 | 50 | 59 |
|     | Notched Izod impact strength at −30° C. | kJ/m$^2$ | 25 | 19 | 15 | 51 | 20 | 26 |
|     | Tracking resistance (performance classification rank) |     | 2 | 2 | 2 | 3 | 2 | 2 |
|     | UL94 combustibility (1/16 inch) |     | V-0 | V-0 | V-0 | V-0 | V-0 | V-0 |

TABLE 3-2

|     |     |     | Comparative Example | | | | |
|---|---|---|---|---|---|---|---|
|     |     | Unit | 7 | 8 | 9 | 10 | 11 |
| (A-1) | PC-PDMS copolymer |     | A-1-1 | A-1-1 | A-1-1 | A-1-2 | A-1-5 |
|     |     | mass % | 80 | 80 | 0 | 80 | 80 |
|     | Average repetition number n of PDMS |     | 90 | 90 | 90 | 40 | 700 |
|     | Content of PDMS block moiety | mass % | 6 | 6 | 6 | 6 | 6 |
| (A-2) | Aromatic polycarbonate resin except component (A-1) | mass % | 20 | 20 | 20 | 20 | 20 |
|     | Content of PDMS block moiety in component (A-1) + component (A-2) | mass % | 4.8 | 4.8 | 4.8 | 4.8 | 4.8 |
| (B) | Alkaline (earth) metal salt of organic sulfonic acid | part(s) by mass | 0.03 | — | 0.2 | 0.03 | 0.03 |
| (C) | Polytetrafluoroethylene | part(s) by mass | 0.05 | 0.3 | 0.3 | 0.3 | 0.3 |
| (D) | D-1: titanium dioxide-1 (coated with trimethylolpropane) | part(s) by mass | — | — | — | 5 | 5 |
|     | D-2: titanium dioxide-2 (coated with trimethylolpropane) | part(s) by mass | 5 | — | — | — | — |
|     | D-3: titanium dioxide-3 (coated with trimethylolethane) | part(s) by mass | — | 5 | 5 | — | — |
| (d) | d-4: titanium dioxide-4 (coated with alumina) | part(s) by mass | — | — | — | — | — |
|     | d-5: titanium dioxide-5 (coated with dimethylpolysiloxane) | part(s) by mass | — | — | — | — | — |
|     | d-6: titanium dioxide-6 (coated with triethanolamine) | part(s) by mass | — | — | — | — | — |
| (E) | Polyorganosiloxane | part(s) by mass | 0.1 | 0.1 | 0.1 | 0.1 | 0.1 |
| (F) | Carbon black | part(s) by mass | 1 | 1 | 1 | 1 | 1 |
| Evaluation | Notched Izod impact strength at 23° C. | kJ/m$^2$ | 77 | 78 | 78 | 62 | 71 |
|     | Notched Izod impact strength at −30° C. | kJ/m$^2$ | 51 | 50 | 50 | 28 | 48 |
|     | Tracking resistance (performance classification rank) |     | 2 | 2 | 2 | 2 | 2 |
|     | UL94 combustibility (1/16 inch) |     | V-1 | V-1 | V-1 | V-0 | V-1 |

As can be seen from Table 2-1 to 2-2 and Table 3-1 to 3-2, the polycarbonate-based resin compositions of Examples 1 to 13 show more excellent characteristics than those of the polycarbonate-based resin compositions of Comparative Examples 1 to 11. That is, each of the polycarbonate-based resin compositions of Examples 1 to 13 has good tracking resistance and a high degree of flame retardancy while retaining excellent impact strengths at normal temperature (23° C.) and a low temperature (−30° C.). On the other hand, the polycarbonate-based resin compositions of Comparative Examples 1 to 11 were each poor in any one of low-temperature impact strength at −30° C., tracking resistance, and flame retardancy, and a resin composition satisfying all the characteristics was not obtained.

INDUSTRIAL APPLICABILITY

The polycarbonate-based resin composition of the present invention is suitable as a material for a structure member for solar photovoltaic power generation such as a junction box for solar photovoltaic power generation to be placed outdoors because the composition has tracking resistance and excellent flame retardancy without impairing a low-temperature impact characteristic.

The invention claimed is:

1. A polycarbonate-based resin composition, comprising:
(A) 100 parts by mass of a resin mixture comprising
    (A-1) 30 to 100 mass % of a polycarbonate-polyorganosiloxane copolymer comprising a constituent unit represented by-formula (I):

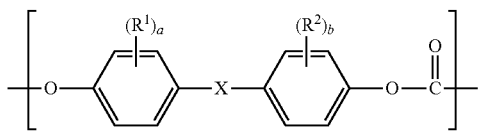

and a constituent unit represented by formula (II):

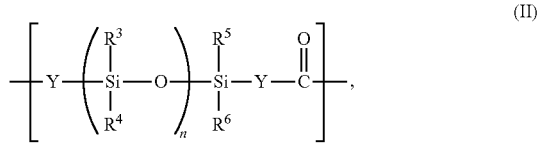

and
(A-2) 70 to 0 mass % of an aromatic polycarbonate resin different from the polycarbonate-polyorganosiloxane copolymer (A-1);
(B) 0.01 to 0.15 part by mass of alkali metal salt, an alkaline earth metal salt, or both, of an organic sulfonic acid;
(C) 0.1 to 1 part by mass of a polytetrafluoroethylene having a fibril-forming ability;
(D) 2 to 15 parts by mass of titanium dioxide particles each having, on an outermost surface thereof, a coating layer comprising a polyol free of a nitrogen atom; and
(F) 0.5 to 3 parts by mass of an acidic carbon black with respect to 100 parts by mass of the resin mixture (A).
wherein $R^1$ and $R^2$ each independently represent an alkyl group having 1 to 6 carbon atoms or an alkoxy group having 1 to 6 carbon atoms;
X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—;
a and b each independently represent an integer of 0 to 4;
$R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms;
Y represents an organic residue comprising an aliphatic group or an aromatic group; and
n represents an average repetition number and is an integer of 70 to 500.

2. The polycarbonate-based resin composition according to claim 1, wherein the resin mixture (A) comprises a polyorganosiloxane block moiety as the constituent unit of the formula (II) in an amount of 2 to 30 mass %.

3. The polycarbonate-based resin composition according to claim 1,
wherein the polyol free of the nitrogen atom comprises at least one selected from the group consisting of trimethylolpropane, trimethylolethane, ditrimethylolpropane, trimethylolpropane ethoxylate, and pentaerythritol.

4. The polycarbonate-based resin composition according to claim 1, wherein the alkali metal salt, the alkaline earth metal salt, or both, of the organosulfonic acid (B) comprises an alkali metal salt, an alkaline earth metal salt, or both, of a perfluoroalkanesulfonic acid.

5. The polycarbonate-based resin composition according to claim 1, further comprising 0.05 to 0.30 part by mass of a polyorganosiloxane (E) with respect to 100 parts by mass of the resin mixture (A).

6. The polycarbonate-based resin composition according to claim 1, wherein said acidic carbon black (F) has a pH of 6 or less 7. A molded article, obtained by a process comprising molding the polycarbonate-based resin composition according to claim 1.

8. A solar photovoltaic power generation apparatus, comprising a molded article according to claim 7.

9. The polycarbonate-based resin composition according to claim 1, wherein a ratio of said acidic carbon black/titanium dioxide particles is 1/3 to 1/10.

* * * * *